US010846974B2

(12) United States Patent
Knepler et al.

(10) Patent No.: US 10,846,974 B2
(45) Date of Patent: Nov. 24, 2020

(54) BEVERAGE COMMUNICATIONS SYSTEM USING A COMMUNICATION PROTOCOL

(71) Applicant: BUNN-O-MATIC CORPORATION, Springfield, IL (US)

(72) Inventors: John T. Knepler, Springfield, IL (US); Scott A. Mazzini, Springfield, IL (US); Brian Yeazel, Springfield, IL (US); Edward Handley, Murrayville, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 347 days.

(21) Appl. No.: 15/305,428

(22) PCT Filed: Apr. 21, 2015

(86) PCT No.: PCT/US2015/026862
§ 371 (c)(1),
(2) Date: Oct. 20, 2016

(87) PCT Pub. No.: WO2015/164366
PCT Pub. Date: Oct. 29, 2015

(65) Prior Publication Data
US 2017/0046903 A1 Feb. 16, 2017

Related U.S. Application Data

(60) Provisional application No. 61/981,881, filed on Apr. 21, 2014, provisional application No. 61/986,980, filed on May 1, 2014.

(51) Int. Cl.
*G07F 13/06* (2006.01)
*H04W 4/70* (2018.01)
(Continued)

(52) U.S. Cl.
CPC .......... *G07F 13/065* (2013.01); *G06Q 50/12* (2013.01); *G07F 9/02* (2013.01); *H04W 4/70* (2018.02)

(58) Field of Classification Search
CPC ........ H05B 6/00; A47J 31/047; G07F 13/065; G07F 9/02; H04W 4/70; G06Q 50/12
(Continued)

(56) References Cited

U.S. PATENT DOCUMENTS 5,539,671 A * 7/1996 Albrecht ............. A47J 37/1266
700/299
6,104,494 A 8/2000 Torbet et al.
(Continued)

OTHER PUBLICATIONS

Search Report and Written Opinion issued in Int'l App. No. PCT/US2015/026862 (2015).

*Primary Examiner* — Luna Champagne
(74) *Attorney, Agent, or Firm* — Barnes & Thornburg LLP

(57) ABSTRACT

A beverage communication network having a brewer, stands, and servers atop the stands, in which the brewer and the stands communicate in accordance with a suitable wired or wireless communication protocol, such as Bluetooth® Low Energy. The brewer can monitor the status of the servers, including the freshness and temperature of the beverage contained within the servers, the equipment status of the servers, and communication signal quality in the network. The status of the servers can be displayed to an on-site user through a tablet computer coupled to the brewer or to a remote user through a computer connected to the Internet.

13 Claims, 5 Drawing Sheets

(51) Int. Cl.
*G07F 9/02* (2006.01)
*G06Q 50/12* (2012.01)
*H05B 6/00* (2006.01)
*A47J 31/047* (2006.01)

(58) Field of Classification Search
USPC .................................................. 705/15
See application file for complete search history.

(56) References Cited

U.S. PATENT DOCUMENTS

| | | | |
|---|---|---|---|
| 6,106,877 A | 8/2000 | Allington et al. | |
| 7,158,918 B2 | 1/2007 | Bunn et al. | |
| 7,162,391 B2 | 1/2007 | Knepler et al. | |
| 7,197,377 B2 | 3/2007 | Knepler | |
| 7,268,698 B2 | 9/2007 | Hart et al. | |
| 7,285,300 B1 | 10/2007 | Allington et al. | |
| 7,564,370 B2 | 7/2009 | Hart et al. | |
| 7,607,103 B2 | 10/2009 | Thompson | |
| 7,820,948 B1 * | 10/2010 | Renau | A47J 31/467 219/494 |
| 7,890,209 B2 | 2/2011 | Knepler | |
| 7,904,357 B2 | 3/2011 | Bunn | |
| 7,998,515 B2 | 8/2011 | Weisberg et al. | |
| 8,170,834 B2 | 5/2012 | Knepler et al. | |
| 8,610,536 B2 * | 12/2013 | Libby | B67D 1/0041 235/380 |
| 8,621,980 B2 * | 1/2014 | Bunn | A47J 31/007 222/146.5 |
| 2009/0177318 A1 | 7/2009 | Sizemore | |
| 2009/0219140 A1 | 9/2009 | Guard et al. | |
| 2011/0032913 A1 * | 2/2011 | Patil | H04W 72/08 370/338 |
| 2011/0212231 A1 * | 9/2011 | McLaughlin | A47J 31/36 426/231 |
| 2013/0311140 A1 * | 11/2013 | Schechter | H04L 67/34 702/188 |

* cited by examiner

BEVERAGE COMMUNICATIONS SYSTEM USING A COMMUNICATION PROTOCOL

CROSS REFERENCE TO RELATED APPLICATIONS

This application is a U.S. nationalization under 35 U.S.C. § 371 of International Application No. PCT/US2015/026862, filed Apr. 21, 2015, which claims priority based upon U.S. Provisional Patent Application Ser. No. 61/981,881, filed Apr. 21, 2014, and entitled BEVERAGE COMMUNICATIONS SYSTEM USING A LOW ENERGY COMMUNICATION PROTOCOL, and also claims priority based upon U.S. Provisional Patent Application Ser. No. 61/986,980, filed May 1, 2014, and entitled BEVERAGE COMMUNICATIONS SYSTEM USING A LOW ENERGY COMMUNICATION PROTOCOL. The disclosures of each of which are hereby incorporated by reference in their entireties.

BACKGROUND

Restaurants, cafeterias, banquet halls, retail establishments, and hospitality environments often include beverage stations having multiple servers (i.e., beverage dispensers) from which customers or guests can obtain beverages. Over time, however, any given server may run out of the beverage that it was dispensing. Moreover, the beverage contained within the server may age and fall outside of a predetermined freshness range or drop below a predetermined temperature threshold.

One way to address these issues is by having an employee physically visit the serving stations and inspect each server to determine whether the server has gone empty, whether the beverage within the server is no longer fresh, whether the temperature of the beverage within the server requires adjustment, or to generally determine the status of the server, such as whether it is malfunctioning. However, requiring an employee to physically visit each serving station is inefficient and costly. Moreover, it does not provide real-time feedback on the status of the servers. For example, minutes or hours may pass before a human visits a server and realizes that it is empty or that its contents have gone stale. This could negatively impact product quality as well as the customer experience and customer satisfaction.

Accordingly, it would be desirable to develop improved systems, components, and methodologies for monitoring the status of servers using a communication network. It would further be desirable to provide systems, components, and methodologies by which instructions could be sent to the servers using the communication network that would cause the servers to modify their settings as to improve the quality of the beverage that the servers dispense. It would be desirable if the communication network offered reliable communications having suitable scalability, suitable range, suitable reliability, and suitable security.

This background information is provided to provide some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

SUMMARY

The present disclosure describes systems, components, and methodologies for providing a beverage communication network that allows for communication among brewer(s) and stands. Disclosed embodiments allow brewers and stands to communicate information about the status of servers that rest on the stands. In certain embodiments, the brewer(s) and stands communicate information related to beverage freshness, beverage levels, beverage temperatures, along with information about equipment status and the performance of communication links within the beverage communication network.

In certain disclosed embodiments, the information related to beverage freshness, beverage levels, beverage temperatures, and equipment status are monitored and, based on the monitoring and as appropriate, the beverage communication network causes lights or other indicators near servers to activate in order to indicate that the servers require attention.

In certain disclosed embodiments, the beverage communication network allows an on-site user or a remotely located user to monitor the status of the servers using a computing device that is in communication with the brewer(s). Disclosed embodiments also include multiple brewer systems, for which information regarding some or all of the brewers and/or some or all of the stands are shared among stands and brewers.

The beverage communication network may operate according to any suitable wired or wireless communication technology. In exemplary implementations, the beverage communication network operates according to communications standards provided by the Bluetooth SIG organization, the Wi-Fi organization, the ZigBee organization, the Z-wave organization, any of several IEEE wired and wireless networking specifications and/or the power line carrier specifications. According to certain aspects of the present disclosure, the use of a specific protocol can be chosen to provide robust, secure and economical communication means for a specific retail or hospitality environments, interference-mitigating features suitable for environments in which other wired or wireless networks may be operating nearby, and desirable security features.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The present disclosure will be described hereafter with reference to the attached drawings which are given as non-limiting examples only, in which.

Figure 1:
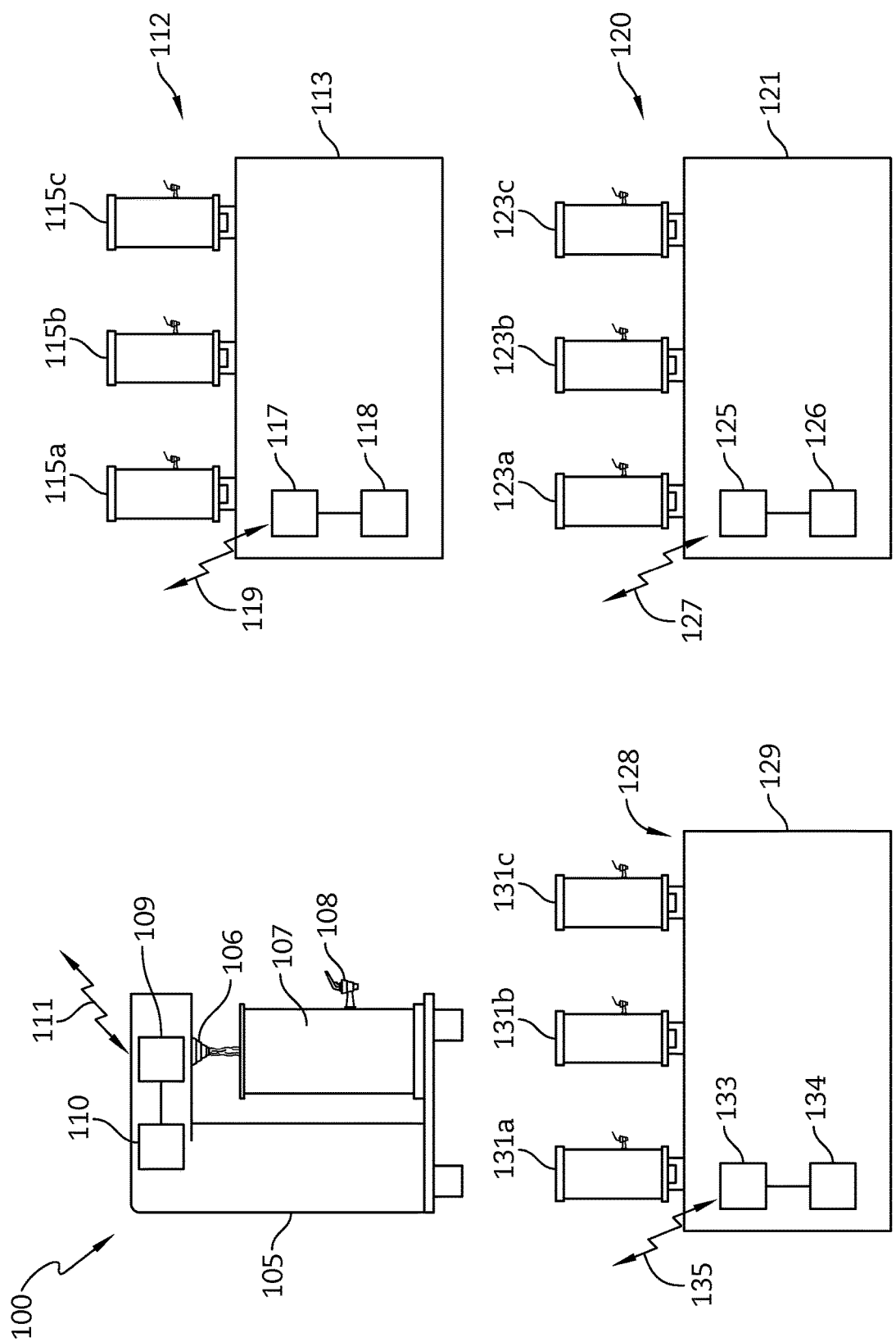
FIG. 1 is a diagrammatic illustration of a version of a beverage communication network having a brewer and serving stations.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

With reference to FIG. 1, a beverage communication network 100 is shown. The beverage communication network 100 can be placed in any number of locations, but in certain embodiments, is located in a retail location at which beverages are distributed, such as a coffee shop, a convenience store, a fast food restaurant, a hotel, or the like. The beverage communication network 100 can be used in connection with any type of beverage, include coffee, tea, cocoa, ciders, juices, water, or other forms of beverage. Although exemplary beverage dispensing equipment is depicted in FIG. 1, it should be understood that beverage communication network 100 can accommodate any beverage dispensing equipment, such as any beverage dispensing equipment distributed by BUNN-O-MATIC® Corp. of Springfield, Ill.

The beverage communication network 100 includes a brewer 105, a first serving station 112, a second serving station 120, and a third serving station 128. The first serving station 112 includes a stand 113 upon which rest three servers 115a, 115b, and 115c. Similarly, the second serving station 120 includes a stand 121 upon which rest three servers 123a, 123b, and 123c. Finally, the third serving station 128 includes a stand 129 upon which rest three servers 131a, 131b, and 131c.

By way of overview, the beverage communication network 100 allows the brewer 105 to communicate with the stands 113, 121, and 129 using a communication protocol. In illustrative embodiments, the communication protocol is a wireless networking protocol, such as the Bluetooth® Low Energy ("BLE") specification, although other wired or wireless communication protocols are within the scope of the present disclosure. The brewer 105 is able to collect information regarding the status of the servers 115a-c, 123a-c, and 131a-c, including information about the beverage freshness, beverage levels, and temperature of the beverages stored within the servers 115a-c, 123a-c, and 131a-c. Other information can also be transmitted on the beverage communication network 100, including information about the status of the brewer 105 and the serving stations 112, 120, 128 (such as whether any equipment is malfunctioning) and information about the signal quality for communication links in the beverage communication network 100.

This information may be used to provide visual indicators or other types of notifications to users when certain servers 115a-c, 123a-c, or 131a-c require attention, may allow a user to monitor the status of the servers 115a-c, 123a-c, and 131a-c using a separate computing device (not shown in FIG. 1, but to be discussed in connection with FIG. 4), and may allow a user to monitor whether communications are effectively being transmitted across the beverage communication network 100.

In more detail with respect to FIG. 1, the brewer 105 is shown in conjunction with a server 107. In operation, the brewer 105 brews a beverage and dispenses the beverage into the server 107 through a dispensing element 106. The server 107 is then transported to either the first serving station 112, the second serving station 120, or the third serving station 128. After the brewer is placed at a serving station 112, 120, or 128, a customer can dispense the beverage stored within the server 107 using a dispensing valve 108.

In certain embodiments, when the brewer 105 fills the server 107 with a beverage, the brewer 105 records a timestamp using an internal clock (not shown) indicating a time at which it filled the server 107. The brewer 105 stores the timestamp within its internal system memory (not shown in FIG. 1, but to be discussed in connection with FIG. 2). The brewer 105 may also record the type of beverage with which it filled the server 107 e.g., coffee versus tea, which type of coffee, whether the coffee was decaffeinated, which type of tea, etc.

Although this illustrative embodiment shows the beverage communication network 100 having three serving stations 112, 120, and 128, in other illustrative embodiments, the beverage communication network 100 may include fewer or additional serving stations. Likewise, this illustrative embodiment shows each serving station 112, 120, and 128 having three servers (e.g., in the case of serving station 112, servers 115a, 115b, and 115c), but in other illustrative embodiments, fewer servers or more servers may be provided. Additionally, this illustrative embodiment shows one brewer 105 but in other illustrative embodiments, the beverage communication network 100 may include more than one brewer. Generally, the number of servers and/or brewers allowed for in the beverage communication network 100 may be governed by the limits of the communication protocol governing the beverage communication network 100. In the illustrative example where BLE is used, may devices may be supported and the disclosed embodiments can support correspondingly many servers. In certain embodiments, each serving station 112, 120, and 128 contains 32 servers.

The servers 115*a-c*, 123*a-c*, and 131*a-c* are placed on their respective stands 113, 121, and 129. In certain embodiments, the servers 115*a-c*, 123*a-c*, and 131*a-c* are coupled to their respective stands 113, 121, and 129 with a mechanical connection that keeps the servers 115*a-c*, 123*a-c*, and 131*a-c* in place, and with a power connection that provides electrical power from the stands 113, 121, and 129 to the servers 115*a-c*, 123*a-c*, and 131*a-c*.

In order to allow for communications among the components of the beverage communication network 100, certain components of the beverage communication network are provided with communication modules that allow communication according to a protocol. As explained, in illustrative embodiments the beverage communication network 100 may use communication modules implementing BLE to provide communications functionality. BLE technology, as an example, is suitable at least because it has low energy requirements, it is inexpensive to implement, it provides desirable security features, it provides scalability suitable for deployment of the communication network 100 in spaces requiring many serving stations, and it provides communication ranges suitable for deployment of the communication network 100 in retail locations having a variety of sizes.

Thus, the brewer 105 includes a communication module 109 that allows for transmission and reception of data through wireless signals 111. The brewer 105 also includes a control module 110, which controls the operation of the brewer 105 and communicates with the communication module 109. Similarly, the stand 113 includes a communication module 117 and a control module 118 for transmission, reception, and processing of data through wireless signals 119, the stand 121 includes a communication module 125 and a control module 126 for transmission, reception, and processing of data through wireless signals 127, and the stand 129 includes a communication module 133 and a control module 134 for transmission, reception, and processing of data through wireless signals 135.

Figure 2A:
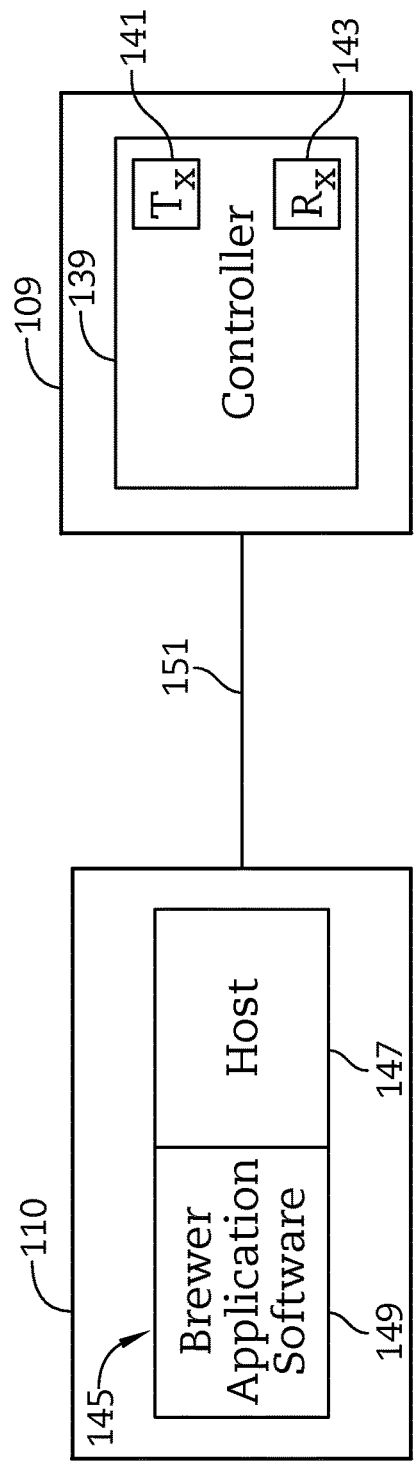
FIG. 2A is a block diagram depicting exemplary hardware and software components of a communication module and a control module provided on a brewer.

FIG. 2A shows a more detailed view of the communication module 109 and the control module 110 provided in the brewer 105. As known in the art, there are a variety of ways to implement BLE functionality on a device, and any appropriate implementation methodology that provides BLE compliance will be suitable for the illustrative beverage communication network 100 implementing BLE technology. In this illustrative embodiment, the communication module 109 includes a communication controller 139. Where communications are provided in accordance with BLE, the communication controller 139 implements the Physical Layer and Link Layer functionality of the BLE specification. The communication controller 139 may be implemented as a microcontroller or as a system on a chip ("SOC"). The communication controller 139 includes integrated radio components, including a transmitter 141 and receiver 143. The communication controller 139 may include additional memory components, such as a RAM (not shown). Where the beverage communication network 100 provides communications using other types of wired or wireless protocols, the communication controller 139 may implement analogous functionality in accordance with those respective wired or wireless protocols.

The control module 110 includes a microcontroller 145 that executes program code. In one respect, the microcontroller 145 executes code associated with communication host software 147. Where communications are provided in accordance with BLE, the microcontroller 145 includes software that implements the Logical Link Control and Adaptation Protocol (L2CAP) layer, the Attribute Protocol (ATT) layer, the Generic Attribute Profile (GATT) layer, the Security Manager Protocol (SMP) layer, and the Generic Access Profile (GAP) layer of the BLE specification. Where the beverage communication network 100 provides communications using other types of wired or wireless protocols, the microcontroller 145 may implement analogous functionality in accordance with those respective wired or wireless protocols.

The microcontroller 145 also executes code associated with brewer application software 149, whose functionality will be discussed in more detail below. It should be understood that brewer application software 149 and/or communication host software 147 can be written in any suitable programming language for execution on a microcontroller, such as C or assembly, and then compiled for execution on the microcontroller 145. The microcontroller 145 may include additional memory components, such as a RAM (not shown). Brewer application software 149 may communicate with communication host software 147 using any suitable inter-software communication capability (e.g., through API's exposed by communication host software 147, through remote procedure calls between communication host software 147 and brewer application software 149, etc.).

The specific communication functionality implemented on the communication module 109 on the one hand and the control module 110 on the other hand can be varied while staying within the scope of the present disclosure. By way of example, the full suite of functionality of the communication protocol stack could be provided on a single chip, two chips, or more than two chips. The chips could be microcontrollers or more fully functional systems-on-chips. While certain aspects of a communication protocol's functionality associated with lower layers of the communication protocol, such as the physical layer, will be implemented in hardware, other layers may be implemented in either hardware, software, or firmware.

The control module 110 and the communication module 109 can communicate using any suitable mechanism, but in this embodiment as an illustration but not a limitation, they communicate through a serial connection 151. In certain embodiments, the control module 110 and the communication module 109 are provided on a common circuit board and the serial connection 151 takes the form of a serial bus. In other embodiments, the control module 110 and the communication module 109 are provided on separate circuit boards and connect through other signaling mechanisms, such as cabling.

In certain embodiments, the control module 110 supplies power (e.g., 5 volts DC) to the communication module 109. In other embodiments, the control module 110 and the communication module 109 draw from a common power source (not shown).

Figure 2B:
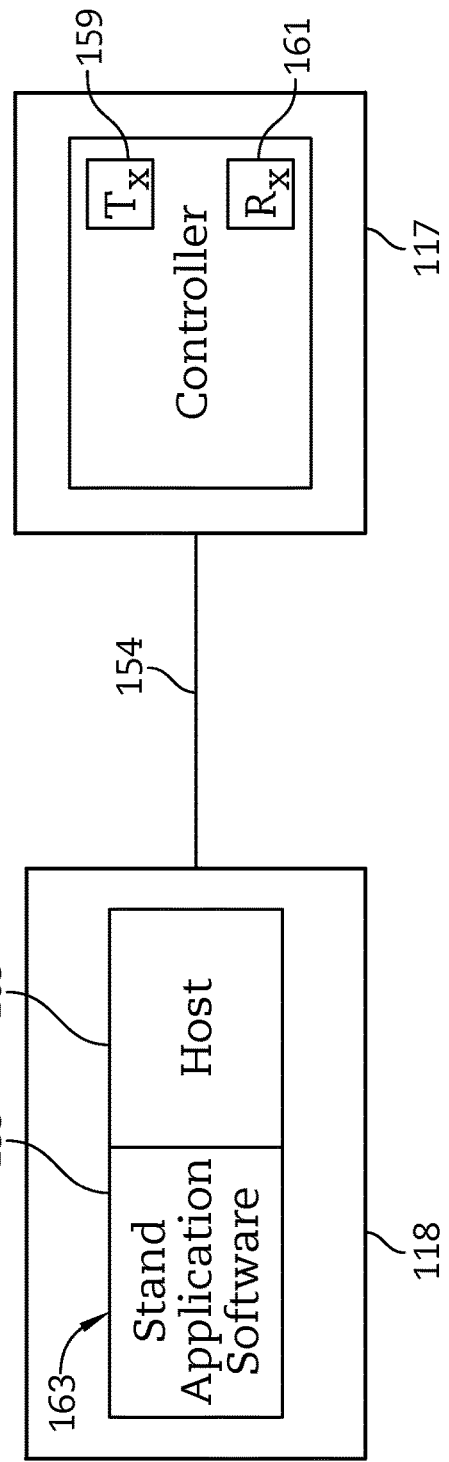
FIG. 2B is a block diagram depicting exemplary hardware and software components of a communication module and a stand.

FIG. 2B shows a more detailed view of the exemplary communication module 117 and control module 118 provided in the stand 113, but it should be understood that the communication module 125 and the communication module 133 may be substantially the same as the communication module 117, and that the control module 126 and the control module 134 may be substantially the same as the control module 118.

The communication module 117 and control module 118 provided in the stand 113 may be similar to the communication module 109 and the control module 110 provided in the brewer 105. Specifically, the communication module 117 may be similar to the communication module 109, having a communication controller 157 that may be similar to the communication controller 139, and a transmitter 159 and receiver 161 that may be similar to the transmitter 141 and the receiver 143, respectively.

Likewise, the microcontroller 163 may be similar to the microcontroller 145 in that the communication module host 165 may be similar to the communication module host 147. However, the microcontroller 163 will execute code associated with stand application software 153 rather than the brewer application software 149. The functionality implemented by the stand application software 153 will be discussed in more detail below.

According to one aspect of illustrative embodiments of the present disclosure, the beverage communication network 100 may be implemented as a star or layered star network. When implemented using BLE, the brewer 105 operates as a BLE master in accordance with the BLE specification, and the stands 113, 121, and 129 operate as BLE slaves in accordance with the BLE specification. This arrangement allows the brewer 105 to operate as a central coordinator of communications among the brewer 105 and the stands 113, 121, and 129. This arrangement is advantageous at least because it allows for the stands 113, 121, and 129 to consume less power than the brewer 105 in connection with BLE transmissions, and because it may allow for the stands 113, 121, and 129 to implement lower cost communication modules 117, 125, and 133 than the communication module 109 provided with the brewer 105.

Figure 3:
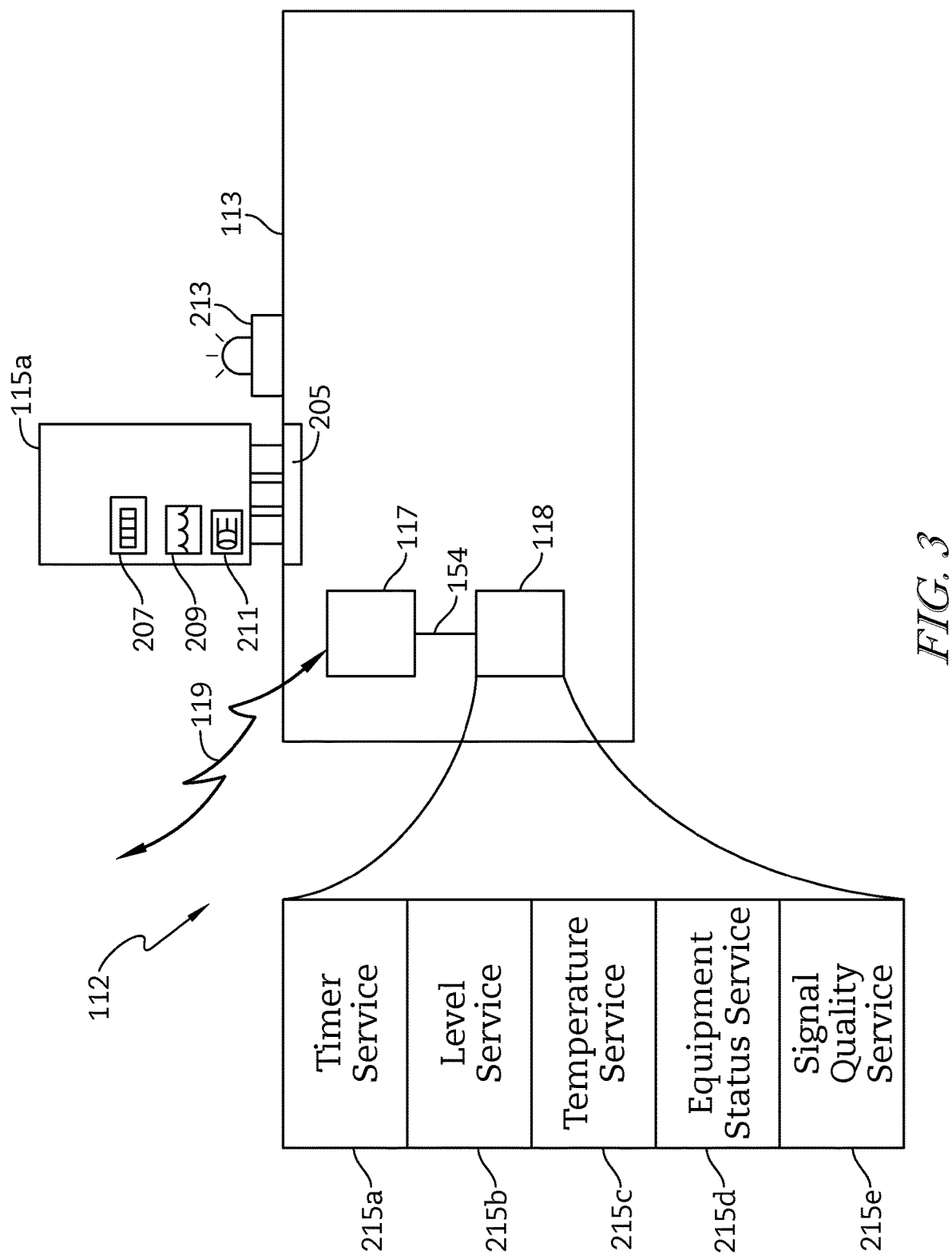
FIG. 3 is a more detailed view of a portion of the beverage communication network depicted in FIG. 1, and shows hardware and software components by which the beverage communication network allows for monitoring of beverage freshness, beverage levels, beverage temperatures, equipment status, and signal quality.

FIG. 3 shows a more detailed view of a portion of the serving station 112, but it should be understood that serving stations 120 and 128 contain and use similar structures, components, and methodologies. When the beverage communication network 100 is implemented in accordance with BLE, the stand 113 operates as a BLE server to the brewer 105, which acts as a BLE client. Thus, the stand 121 exposes several BLE services. In this illustrative embodiment, the stand 121 exposes a timer service 215a, a level service 125b, a temperature service 216c, an equipment status service 215, and a signal quality service 215e. As depicted in FIG. 2, software associated with the timer service 215a, the level service 125b, the temperature service 216c, the equipment status service 215d, and the signal quality service 215e may be executed in the control module 118. In other embodiments, one or more of these services (e.g., the signal quality service 215e) may be implemented in the communication module 117. The timer service 215a is used to communicate freshness information to the brewer 105, the level service 215b is used to communicate beverage level information to the brewer 105, the temperature service 215c is used to communicate temperature information to the brewer 105, the equipment status service 215d is used to communicate the status of the serving station 112, including whether any of its components are malfunctioning, and the signal quality service 215e is used to communicate information on the signal quality of wireless signals 119.

To provide the timer services 215a, the server 115a includes a timer component 207. The timer component 207 can measure absolute time of day (e.g., 4:05 PM), preferably to a resolution of at least minutes, and in certain embodiments to a resolution of seconds. The timer component 207 can also be a countdown timer that is set to a predetermined value when the brewer 105 fills the server 115a with a beverage, in which case the timer component 207 counts down until it reaches zero. The timer component 207 can also be a real time clock that counts up from a point in time when the beverage communication network 100 is reset.

To provide the level service 215b, the server 115a includes a level monitoring component 209. The level monitoring component 209 can be any sensor capable of identifying information regarding how much beverage is contained within server 115a and/or whether the quantity of beverage is below a certain level in server 115a. By way of example, the level monitoring component 209 may be a conductivity sensor to detect the presence or absence of liquid that is mounted within the server 115a at a predetermined height or range of heights. A reading by the level monitoring component 209 of conductivity or a lack of conductivity indicates that the beverage level within the server 115a is outside of the threshold level at which the level monitoring component 209 detects the presence or absence of liquid.

To provide the temperature service 215c, the server 115a includes a temperature sensor 211. Any temperature sensor capable of measuring the temperature of beverages will be suitable, and preferably the temperature sensor 211 will have a thermal range and sensitivity suitable for use with hot beverages. In certain embodiments, a thermistor is used to measure temperature changes.

To provide the equipment status service 215d, the server 115a may communicate status indicators to the control module 118. For example, a separate status signal may be issued for various components of the server 115a, including its power source and delivery mechanisms, its internal circuitry, its dispensing mechanisms, its heating element 205, or any other hardware or software component. If the status indicators to the control module 118 indicate that any component is malfunctioning, or if the control module 118 fails to receive a status indicator for any component, the control module 118 may conclude that the component is malfunctioning. These status indicators may be made available to the equipment status service 215d.

To provide the signal quality service 215e, the receiver 143 may measure signal quality of the received signal 119. For example, the receiver 143 may measure the signal-to-noise ratio of the received signal 119 and communicate that measurement to the control module 118. These measurements may be made available to the signal quality service 215e.

When beverage communication network 100 is implemented in accordance with BLE, the brewer 105 may act as a BLE client and send periodic requests to the stands 113, 121, or 129 seeking one or more of the timing information from the timer service 215a, beverage level information from the level service 215b, temperature information from the temperature service 215c, equipment status information from the equipment status service 215d, and/or signal quality information from the signal quality service 215e. To do so, by way of example with reference to the stand 113, the communication module 109 of the brewer 105 establishes a BLE connection with the communication module 117 of the stand 113 in accordance with BLE specifications. Then, the brewer application software 149 sends a request via the communication host 147 specifying the service 215a, 215b, 215c, 215d, or 215e from which the brewer 105 seeks information. The communication host 147 processes the request in accordance with BLE specifications and sends the request to the communication module 109 of the brewer 105 via serial link 151. The communication module 109 transmits the request over radio signals 111, which is received by the communication module 117 via radio signals 119.

After receipt, the request is sent to the communication host 165 for processing in accordance with the BLE specification, and is then transmitted to the stand application software 153. The stand application software 153 obtains the requested information from the timer component 207, the level monitoring component 209, the temperature sensor 211, or the control module 118, as appropriate. Specifically, the timer component 207 may send time information—e.g., the time of day, an indication that a timer has expired, etc.—to the stand application software 153. The level monitoring component 209 may send information about the beverage level and/or indications of whether the contents of server 115a have fallen below a certain level to the stand application software 153. The temperature sensor 211 may send temperature readings to the stand application software 153. The control module 118 may send information regarding equipment status and/or signal quality to the stand application software 153.

After the requested information is communicated to the stand application software 153, it is sent to the communication host 165 for processing in accordance with BLE specifications, and then sent to the communication module 117 over the serial link 154. The communication module 117 sends the information according to the BLE specifications through radio signals 119. The information is received by the communication module 109 over radio signals 111, and sent to the communication host 147, which processes the received information according to BLE specifications and transmits the information to the brewer application software 149.

Communications between the stand 113 and the server 115a can be provided by any number of wired or wireless communication mechanisms. In this illustrative embodiment, the server 115a does not have BLE functionality, and thus communicates to the control module 209 using other means. One version of exemplary systems, methods, and components for providing for communications from a beverage dispenser such as the server 115a are set forth in U.S. Pat. No. 7,268,698, the disclosure of which is incorporated by reference herein in its entirety. In other embodiments, the server 115a has BLE functionality and uses BLE communication protocols to transmit information to the communication module 117 of the stand 113.

In the embodiment described above, the stand application software 153 solicits information from the timer component 207, level monitoring component 209, temperature sensor 211, or information regarding equipment status and signal quality only upon request by the brewer 105. As a result, communications only occur on an as-needed basis, providing for low power usage and lower interference. In other embodiments, the stand 113 communicates information periodically using BLE broadcasting functionality, without waiting for a prompt from the brewer 105. The duration of the period between broadcasts will ordinarily be set by the brewer 105, which as explained serves as a BLE master. The duration of the period may depend on which service 215a, 215b, 215c, 215d, or 215e is under consideration. For example, the brewer 105 may want information from the timer service 215a every 15 minutes, information from the level service 215b every 5 minutes, information from the temperature service 215c every 1 minute, information from the equipment status service every 5 minutes, and information from the signal quality service every second.

The embodiments described above are illustrative. It should be understood that any suitable mechanism in accordance with any suitable wired or wireless communication protocol, including those described above, can be used to communicate the above-described information to the brewer 105.

As explained, upon receipt of timing information from the timer component 207, the information is transmitted to the brewer application software 149 after being processed by the communication host 147. The brewer application software 149 may determine whether the beverage contained within server 115a is still fresh. As explained earlier, the brewer 105 may have logged a times tamp when initially filling the server 115a. It may compare the timing information from the timer component 207 to the timestamp that it previously logged to compute how long the beverage within the server 115a has been sitting on the stand 113. The brewer application software 149 may maintain look-up tables indicating the duration of time with which respective types of beverages stay fresh and may determine what type of beverage is contained within the server 115a. Based on this information, the brewer application software 149 may determine whether the beverage within the server 115a is still fresh.

If the brewer application software 149 determines that the beverage within the server 115a is not fresh, it may invoke a connection (e.g., a BLE connection) with the stand 113 in order to communicate to the stand 113 that the beverage within the server 115a is not fresh. The communication will be transmitted from the communication module 109 of the brewer 105 to the communication module 117 of the stand 113, and will ultimately be received by the stand software application 153. The stand application software 153 may be configured to activate a lighting element 213 (e.g., a light bulb, LED, etc.) to visually indicate that the server 115a requires attention. Upon seeing the visual indication, a human operator may visit the server 115a to refresh the beverage contained in the server 115a. Other notification types, such as audio notifications, are also within the scope of the present disclosure.

Upon receipt of the beverage level information from the level monitoring component 209, the brewer application software 149 may determine that the server 115a is empty or requires a refill. Upon such a determination, the brewer application software 149 may send a communication to the stand 113 in accordance with the appropriate communications protocol (e.g., BLE) indicating that the server 115a must be refilled. The communication will be transmitted from the communication module 109 of the brewer 105 to the communication module 117 of the stand 113 and will ultimately be received by the stand software application 153. The stand application software 153 may be configured to activate the lighting element 213 to visually indicate that the server 115a requires attention. Other notification types, such as audio notifications, are also within the scope of the present disclosure.

Upon receipt of the temperature information the temperature sensor 211, the brewer application software 149 may determine that the server 115 is maintaining its beverage at an incorrect temperature. The brewer application software 149 may retrieve from system memory a look-up table reflecting the appropriate temperature for different types of beverages, and may also retrieve from system memory an indication of the type of beverage stored within the server 115. The brewer 105 may then determine whether the temperature of the server 115a must be increased or decreased. The brewer 105 then communicates its determination to the stand 113 in accordance with the appropriate communications protocol (e.g., BLE). The communication will be transmitted from the communication module 109 of the brewer 105 to the communication module 117 of the stand 113, and will ultimately be received by the stand application software 153. The stand application software 153 may be configured to activate the lighting element 213 to visually indicate that the server 115a requires attention. Other notification types, such as audio notifications, are also within the scope of the present disclosure.

Alternatively, the stand application software 153 may arrange for a heating element 205 to dissipate more or less heat, as appropriate, to adjust the temperature of the server 115a. Specifically, the server 115a is thermally coupled to the heating element 205. The heating element 205 may be any component that dissipates variable heat in response to an input, such as a resistive heater. Although the heating element 205 is shown as part of the stand 113, in other embodiments, the heating element 205 is provided within the server 115a but its power is provided by the stand 113. The stand application software 153 can operate to increase or decrease the power driving the heating element 205 to either heat or cool the server 115a, as appropriate.

Upon receipt of equipment status information, the brewer application software 149 may determine that the server 115 requires attention in order to rectify equipment malfunctions. In this situation as well, appropriate communications may be transmitted from the communication module 109 of the brewer 105 to the communication module 117 of the stand 113, and ultimately be received by the stand application software 153. The stand application software 153 may be configured to activate the lighting element 213 to visually indicate that the server 115a requires attention. Other notification types, such as audio notifications, are also within the scope of the present disclosure.

Upon receipt of signal quality information, the brewer application software 149 may determine whether the serving station 112 is suffering from poor signal quality. The brewer application software 149 may communicate with other brewers (as will be explained below in connection with FIG. 5), instructing the other brewers to determine whether the serving station 112 might experience improved signal quality from an alternate brewer. In response to such a determination, the serving station 112 may initiate communication with the alternate brewer. If the signal quality information indicates that the serving station 112 has lost connection entirely with the brewer 105, the brewer application software 149 may initiate re-connection protocols with the serving station 112. If the re-connection protocols fail, the brewer application software 149 may communicate with an alternate brewer, instructing the alternate brewer to attempt to establish a connection with the serving station 112.

Although timing information, level information, temperature information, equipment status information, and signal quality information have been discussed in connection with the illustrative embodiment of FIG. 2, the present disclosure contemplates that any other system parameters related to the server 115a and/or the stand 113 can be monitored, communicated, and/or approximated with the related signal communicated to the brewer 105, and that the brewer 105 can communicate about any other system parameters or beverage characteristics to the stand 113. By way of example, the server 115a can include a sensor that detects what type of beverage is contained within the server 115a and communicate that information over the beverage communication network 100. By way of another example, the server 115a can include a sensor that detects the quantity or concentration of a particular ingredient, attribute, chemical, quality, etc., and communicate that information over the beverage communication network 100. This allows the brewer application software 149 to determine whether the beverage within the server 115a is within a predetermined threshold or range, or outside of the threshold or range. According to another example, the server 115a can include a sensor that determines whether the beverage contained in the server 115a is decaffeinated. Information about these characteristics may be transmitted over the beverage communication network 100 in like manner as that described above in connection with the timer service 215a, the level service 215b, and the temperature service 215c.

In other embodiments, the servers 115a-c, 123a-c, and 131a-c communicate identifying information over the beverage communication network 100 that indicates to the brewer application software 149 which servers 115a-c, 123a-c, and 131a-c are at which respective location among the stands 113, 121, and 129. This allows the brewer application software 149 to track and monitor the locations of the servers 115a-c, 123a-c, and 131a-c.

Figure 4:
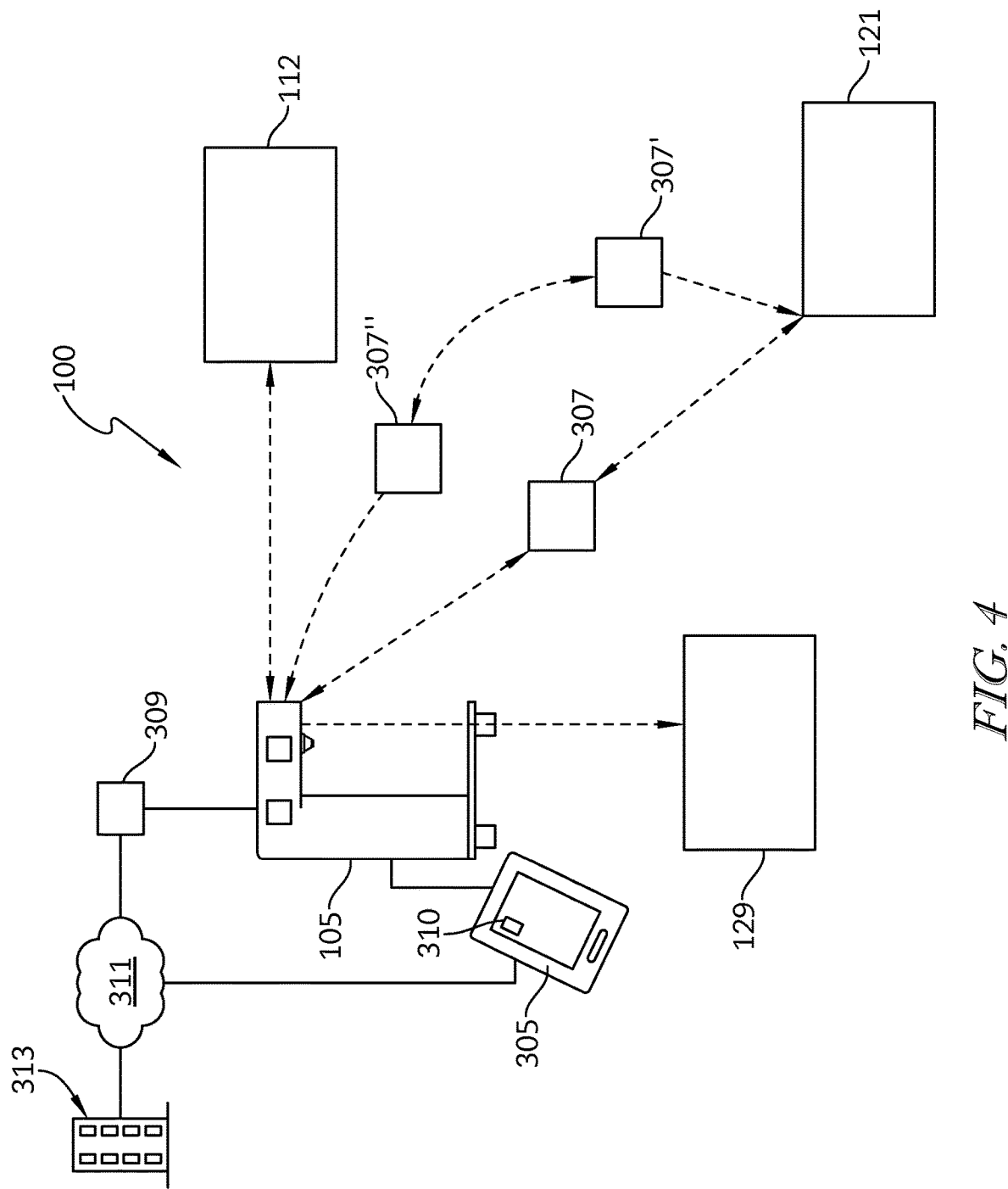
FIG. 4 is a diagrammatic illustration of another configuration of the beverage communication network shown in FIG. 1 that includes a computing device for monitoring and controlling the beverage communication network, repeaters for extending the range of the beverage communication network, and a gateway for connecting the beverage communication network to a corporate IT system.

FIG. 4 shows certain alternative configurations for the beverage communication network 100. In addition to the brewer 105, the first serving station 112, the second serving station 121, and the third serving station 129, the beverage communication network 100 also includes a computing device 305, a repeater 307, and a gateway 309.

The computing device 305 is a tablet computer in this illustrative embodiment, but may also be implemented as a mobile smartphone, a PDA, a multimedia personal computer, a laptop, or any other similar, compatible, or substitutional device or system currently available or hereafter provided. The computing device 305 may include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Computer-executable instructions comprise, for example, instructions and data which cause a general purpose computer, special purpose computer, or special purpose processing device to perform a certain function or group of functions.

The computing device 305 includes an operating system which may be selected from among Apple's iOS line of operating systems, the Android line of operating systems, the Windows Mobile or Windows Phone line of operating systems, BlackBerry operating systems, Linux Operating Systems or future evolution and implementation of device operating systems.

The brewer 105 can communicate with the computing device 305 in any number of ways, including any suitable wired or wireless communication protocol. In certain embodiments, the computing device may be Bluetooth®— or BLE-enabled and the brewer 105 can communicate with the computing device 305 using Bluetooth and/or BLE. In other embodiments, the brewer 105 and the computing device 305 may be 802.11 ("WiFi") enabled. In still other embodiments, the brewer 105 and the computing device 305 may communicate through a USB connection. Other appropriate wired or wireless communication protocols are in accordance with the present disclosure.

The computing device 305 may include a software application 310 (indicated in FIG. 4 by way of an icon on the screen display of the computing device 305) that presents a user with a graphical user interface showing a current status of the servers 115a-c, 123a-c, and 131a-c. The software application 310 may be of the type that is made available for download through application distribution platforms operated by the owner of a mobile operating system, such as the Apple App Store, Google Play, Windows Phone Store or BlackBerry App World. By way of example, the software application 310 may allow a user to observe a freshness level, a fill level, a temperature, an equipment status, and signal quality for each of the servers 115a-c, 123a-c, and 131a-c. The manner by which the brewer 105 can determine a freshness level, a fill level, a temperature, an equipment status, and a signal quality for each of the servers 115a-c, 123a-c, and 131a-c was described above in connection with FIG. 3. A user can thus monitor the servers 115a-c, 123a-c, and 131a-c to determine whether any of the servers 115a-c, 123a-c, and 131a-c require attention.

FIG. 4 also shows a repeater 307. In the configuration of the beverage communication network 100 shown in FIG. 4, the serving station 121 is located out of communication range from the brewer 105. BLE communications from the serving station 121 are transmitted to the repeater 307, which transmits the BLE communications to the brewer 105. Similarly, BLE communications from the brewer 105 intended for the serving station 121 are intercepted by the repeater 307 and retransmitted to the serving station 121. The repeater 307 can be any BLE-enabled device. In other embodiments, for serving stations sufficiently out of range, BLE communications traverse through multiple repeaters similar to the repeater 307, akin to a "daisy chain" of repeaters. This is shown in FIG. 4 with repeaters 307' and 307", which show a "daisy chained" communication path from the serving station 121 to the brewer 105.

In certain embodiments, the repeater 307 may be a computing device akin to the computing device 305, and thus may be a "smart" repeater.

FIG. 4 also shows a gateway 309. The gateway 309 is any Internet-enabled device that communicates to the broader Internet 311, such as a network server. In certain embodiments, the gateway 309 may be Bluetooth- or BLE-enabled and the brewer 105 can communicate with the gateway 309 using Bluetooth and/or BLE. In other embodiments, the brewer 105 and the gateway 309 may be 802.11 ("WiFi") enabled and communicate using WiFi. In still other embodiments, the brewer 105 and the gateway 309 may communicate through a USB connection. Other appropriate wired or wireless communication protocols are in accordance with the present disclosure.

In certain embodiments, the gateway 309 is a computing device akin to the computing device 305, which is also shown to connect to the Internet 311. The computing device 305 can connect to the Internet 311 using any suitable mode of networking, such as an 802.11 "WiFi" connection or a 4G or other cell connection.

The brewer 105 transmits information about the servers 115a-c, 123a-c, and 131a-c, including information about freshness level, fill level, and temperature, to the gateway 309. By doing so, any Internet-enabled computing device may access the information by querying the gateway 309. In FIG. 4, it is depicted that computing devices within an office building 313 (e.g., a corporate headquarters) can query the gateway 309 over the Internet 311 to obtain information about the servers 115a-c, 123a-c, and 131a-c in the retail location containing the beverage communication network 100. This allows corporate managers to monitor and observe the status of the servers 115a-c, 123a-c, and 131a-c.

As explained, the beverage communication network 100 in illustrative embodiments includes components that communicate according to a low energy wireless networking protocol, such as BLE. Thus, in certain embodiments, the beverage communication network 100 operates in the 2.4 GHz Industrial Scientific Medical (ISM) frequency band. In certain embodiments, the beverage communication network 100 implements a protocol offering multiple frequency channels and providing adaptive frequency hopping, as to minimize interference with other wireless communication devices and/or networks in the vicinity of the beverage communication network 100. By way of example, adaptive frequency hopping helps mitigate interference with wireless networks that may be operated by neighboring retail establishments.

In certain embodiments, the total quantity of data transmitted across the beverage communication network 100 is relatively low and is infrequent, making BLE or other low energy wireless communication protocols a suitable choice.

In certain embodiments, the range between the brewer 105 and a serving station 112, 121, or 129 can be a distance up to tens of meters or hundreds of meters, but this range can be extendible by repeaters, such as repeater 307.

In certain embodiments, power is provided to the BLE modules through batteries, such as a CR2032 "button cell" battery.

In certain embodiments, the beverage communication network 100 is implemented with security features. To activate security features, the brewer 105 will pair with the stands 113, 121, and 129. In accordance with the BLE specification, the pairing process involves the exchange of pairing request messages, pairing response messages, encrypting the communications link, and exchange of security keys. The pairing process may be a Secure Simple Pairing process. Generally, any and all security and privacy features offered by the BLE specification may be optionally used with the beverage communication network 100.

Figure 5:
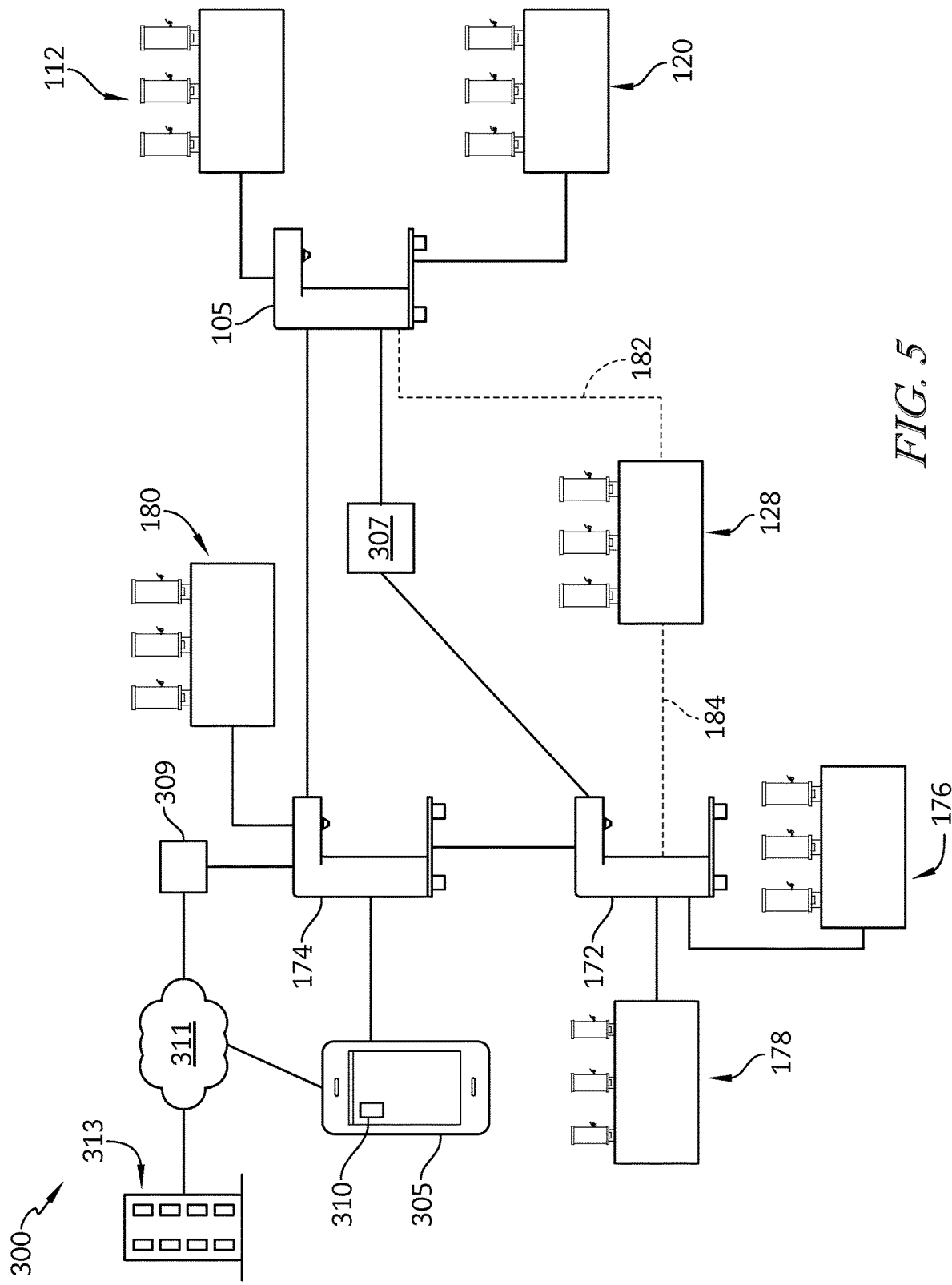
FIG. 5 is a diagrammatic illustration of another configuration of the beverage communication network in which multiple brewers and multiple serving stations are in networked communication and can exchange information both among themselves and with a computing device that monitors and controls the beverage communication network.

FIG. 5 is a diagrammatic illustration of another configuration of a beverage communication network 300 in which multiple brewers 105, 172, 174 and multiple serving stations 112, 120, 128, 176, 178, 180 are in networked communication and can exchange information both among themselves and with computing device 305 that monitors and controls the beverage communication network 300. In this illustrative example, each of the brewers 105, 172, 174 maintains communications with a subset of the serving stations. For example, the brewer 105 maintains communications with the serving stations 112, 120, the brewer 172 maintains communications with the serving stations 176, 178, and the brewer 174 maintains communications with the serving station 180. In this illustrative example, the brewers 105, 172, 174 also maintain communications with one another. Thus, each of the brewers 105, 172, 174 can share information amongst one another regarding all of the serving stations 112, 120, 128, 176, 178, 180 in the beverage communication network 300. In this example, the computing device is in direct communication only with the brewer 174, but obtains information regarding all of the brewers 105, 172, 174 and all of the serving stations 112, 120, 128, 176, 178, 180 due to the above-described network topology, which enables the brewer 174 to aggregate information regarding all of the brewers 105, 172, 174 and all of the serving stations 112, 120, 128, 176, 178, 180 in the beverage communication network 300.

In illustrative embodiments, serving stations may connect to multiple brewers or to the brewer that provides the strongest signal quality. In this example, serving station 128 measures the signal quality of wireless connection 184 with the brewer 172 and the signal quality of wireless connection 182 with the brewer 105, and compares the respective signal quality measurements. The serving station 128 may notify the brewer 105, 172 for which the serving station 128 has highest measured signal quality, and the appropriate brewer 105, 172 may then initiate a connection with the serving station 128. Similarly, as explained above, when any of the serving stations 112, 120, 128, 176, 178, 180 suffer from poor signal quality and/or disconnections, the serving stations 112, 120, 128, 176, 178, 180 may query the brewers 105, 172, 174 to determine which of the brewers 105, 172, 174 will provide improved signal quality. The appropriate brewer 105, 172, 174 may initiate reconnection.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A beverage communication network, comprising:
one or more brewers for brewing a beverage into one or more servers;
one or more serving stations for dispensing the beverage from the one or more servers, wherein the one or more serving stations include one or more stands dimensioned to receive the one or more servers separate and remote from the one or more brewers; and
one or more of a beverage freshness monitor, a beverage level monitor, or a beverage temperature monitor coupled to each of the one or more serving stations, wherein one or more of the beverage freshness monitor, the beverage level monitor, or the beverage temperature monitor coupled with one or more server stations with a stand configured to receive a plurality of servers are configured to communicate with the plurality of servers on the stand to receive sensor data from each respective server of the plurality of servers regarding one or more of freshness, beverage level, or beverage temperature;
wherein the one or more brewers and the one or more serving stations are in networked communication in accordance with a wireless networking protocol to communicate one or more of freshness, beverage level, or beverage temperature of the plurality of servers between the one or more brewers and the one or more server stations.

2. The beverage communication network of claim 1, wherein the wireless networking protocol is a Bluetooth® wireless networking protocol.

3. The beverage communication network of claim 2, further comprising a mobile computing device and wherein the brewer and the mobile computing device are in networked communication with a second wireless networking protocol.

4. The beverage communication network of claim 3, wherein the second wireless networking protocol is a Wi-Fi communication protocol.

5. The beverage communication network of claim 1, wherein each of the one or more brewers includes
a communication module for transmitting and receiving wireless signals in accordance with the wireless networking protocol; and
a control module, in communication with the communication module, that includes brewer application software.

6. The beverage communication network of claim 1, wherein each of the one or more serving stations includes:
a communication module for transmitting and receiving wireless signals in accordance with the wireless protocol; and
a control module that includes application software for controlling functionality of the one or more servers received by each of the one or more serving stations.

7. The beverage communication network of claim 6, wherein the application software includes computer code stored on a memory module which, when executed on a processor, causes the one or more serving stations to:
process queries wirelessly received from at least one of the one or more brewers seeking information regarding one or more of beverage freshness, beverage levels, and beverage temperatures;
retrieve information responsive to the request; and
wirelessly transmit the retrieved information to the at least one of the one or more brewers.

8. The beverage communication network of claim 1, wherein the one or more brewers comprises at least two brewers, and wherein the at least two brewers are in networked communication in accordance with the wireless networking protocol.

9. The beverage communication network of claim 1, wherein each of the serving stations includes a signal quality monitor.

10. The beverage communication network of claim 1, wherein each of the serving stations includes computer code stored on a memory module which, when executed on a processor, causes the serving stations to:
measure a first signal quality for communications received from a first brewer;
measure a second signal quality for communications received from a second brewer;
determine which of the first signal quality and the second signal quality is superior; and
select, as a master communication device, the brewer corresponding to the signal quality determined to be superior.

11. The beverage communication network of claim 1, wherein
the one or more brewers and the one or more serving stations are in networked communication with a mobile computing device; and
the mobile computing device provides a user interface by which a user can monitor beverage level, beverage temperature, and beverage freshness of serving stations located throughout the beverage communication network.

12. The beverage communication network of claim 1, further comprising:

a daisy chain of repeaters connecting the one or more brewers and the one or more serving stations in accordance with the wireless networking protocol; and an Internet gateway for connecting the one or more brewers and the one or more serving stations to the Internet.

13. The beverage communication network of claim 1, wherein a brewer of the one or more brewers operates as a master communication device and the one or more serving stations operate as slave communication devices.

* * * * *